United States Patent
Nakamura

(10) Patent No.: US 10,674,032 B2
(45) Date of Patent: Jun. 2, 2020

(54) IMAGE READING APPARATUS AND IMAGE FORMING APPARATUS

(71) Applicant: CANON KABUSHIKI KAISHA, Tokyo (JP)

(72) Inventor: Takatsugu Nakamura, Kawaguchi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/519,370

(22) Filed: Jul. 23, 2019

(65) Prior Publication Data
US 2020/0036855 A1 Jan. 30, 2020

(30) Foreign Application Priority Data
Jul. 30, 2018 (JP) .................................. 2018-142126

(51) Int. Cl.
*H04N 1/04* (2006.01)
*H04N 1/203* (2006.01)
*H04N 1/00* (2006.01)

(52) U.S. Cl.
CPC ......... *H04N 1/203* (2013.01); *H04N 1/00602* (2013.01); *H04N 1/00615* (2013.01)

(58) Field of Classification Search
CPC . H04N 1/203; H04N 1/00602; H04N 1/00615
USPC .................................. 358/498, 496
See application file for complete search history.

(56) References Cited

U.S. PATENT DOCUMENTS

| | | | | |
|---|---|---|---|---|
| 6,862,115 B1* | 3/2005 | Kondo | ............... | H04N 1/0057 358/472 |
| 7,172,195 B2* | 2/2007 | Sano | ............... | B65H 5/062 271/262 |
| 7,634,205 B2* | 12/2009 | Jen | ............... | G03G 15/6511 399/123 |
| 7,646,515 B2* | 1/2010 | Ichinose | ............... | H04N 1/00909 358/471 |
| 8,508,816 B2* | 8/2013 | Nomura | ............... | G03G 15/602 358/471 |
| 8,543,051 B2* | 9/2013 | Akatsuka | ............... | B65H 5/062 271/225 |
| 2006/0029446 A1* | 2/2006 | Shyu | ............... | G03G 15/6558 399/390 |
| 2009/0092429 A1* | 4/2009 | Yokota | ............... | G03G 21/007 399/360 |

FOREIGN PATENT DOCUMENTS

JP 2016-076825 5/2016

\* cited by examiner

*Primary Examiner* — Cheukfan Lee
(74) *Attorney, Agent, or Firm* — Venable LLP

(57) ABSTRACT

An image reading apparatus includes:
a conveying roller;
a conveyance guide configured to guide an original to a conveyance path, the conveyance guide including a hole in which the conveying roller is disposed;
a first image reading portion configured to read an image on a first side of the original;
a second image reading portion configured to read an image on a second side of the original, the second image reading portion disposed below the conveyance guide;
a transparent member provided on a position apart from the second image reading portion; and
a dustproof member configured to trap a foreign substance falling through a gap between the conveyance guide and the conveying roller at the hole,
wherein
the dustproof member partitions a space between the conveyance guide and the second image reading portion.

7 Claims, 6 Drawing Sheets

IMAGE READING APPARATUS AND IMAGE FORMING APPARATUS

BACKGROUND OF THE INVENTION

Field of the Invention

The present invention relates to an image reading apparatus suitable for an image forming apparatus such as an electrophotographic copying machine and a laser beam printer configured to form an image on a recording medium using an electrophotographic process.

Description of the Related Art

An image reading apparatus mounted on an image forming apparatus is known to read an image while automatically conveying an original by an automatic document feeder (hereinafter, referred to as ADF). According to this configuration, image data of a large amount of originals can be read by a single operation, and thus an improvement of productivity is achieved.

When the ADF is used for reading an image, a scanner unit disposed in an original conveyance path with an intermediary of a transparent member such as glass irradiates an image reading side of the original with light, and images a reflected light on a sensor element to read an image on the original. A dual scan method is also known. In this method, images on both sides of an original are read by using two scanner units. This configuration provides higher productivity.

However, since the scanner unit focuses light on the reading side of the original through the transparent member, if paper dust adhered to the original is adhered to the transparent member, portions blocked from light passage by the paper dust may appear linearly as an image noise. Therefore, disclosed in Japanese Patent Laid-Open No. 2016-76825 is an image reading apparatus in the dual scan method, including a rotating member disposed at a position facing a transparent member of a scanner unit that reads an image on a first side of an original. The rotating member is configured to remove paper dust adhered to a second side of the original. This suppresses the appearance of the image noise appearing linearly due to paper dust when an image on the second side of the original is read.

In the image reading apparatus, in addition to the paper dust adhered to the original, paper dust and shavings of a conveying roller generated by sliding movement of the original and the conveying roller in the conveyance path which conveys the original is also conceivable as factors that may cause the image noise appearing linearly.

With the configuration described in Japanese Patent Laid-Open No. 2016-76825, the paper dust and the shavings of the conveying roller generated in the conveyance path cannot be collected. Therefore, the paper dust and the shavings of the conveying roller generated in the conveyance path may fall, for example, through a gap between the conveyance guide and the conveying roller which guide the original into the conveyance path and may be accumulated in the vicinity of the scanner unit or the transparent member. In such a case, when the original is read, the image noise may appear linearly due to the paper dust and the shavings of the conveying roller generated in the conveyance path, so that image reading quality may be deteriorated.

SUMMARY OF THE INVENTION

It is desirable to suppress deterioration of image reading quality for an original due to paper dust and shavings of a conveying roller generated in an original conveyance path.

A representative configuration of the invention is an image reading apparatus including:

a conveying roller configured to rotate to convey an original;

a conveyance guide configured to guide a lower side of the original and guide the original to a conveyance path, the conveyance guide including a hole in which the conveying roller is disposed;

a first image reading portion configured to read an image on a first side of the original being conveyed in the conveyance path;

a second image configured to read portion reading an image on a second side of the original being conveyed in the conveyance path on a downstream side of the first image reading portion in a conveying direction of the original, the second image reading portion disposed below the conveyance guide;

a transparent member provided on a position apart from the second image reading portion, the transparent member coming into contact with the original when the second image reading portion reads the image; and a dustproof member configured to trap a foreign substance falling through a gap between the conveyance guide and the conveying roller at the hole, wherein the dustproof member partitions a space between the conveyance guide and the second image reading portion.

Further features of the present invention will become apparent from the following description of exemplary embodiments with reference to the attached drawings.

DESCRIPTION OF THE EMBODIMENTS

First Embodiment

<Image Forming Apparatus>

Hereinafter, a general configuration of an image forming apparatus A including an image reading apparatus according to a first embodiment of the invention will be described together with an operation to form an image with reference to the drawings.

Figure 1:
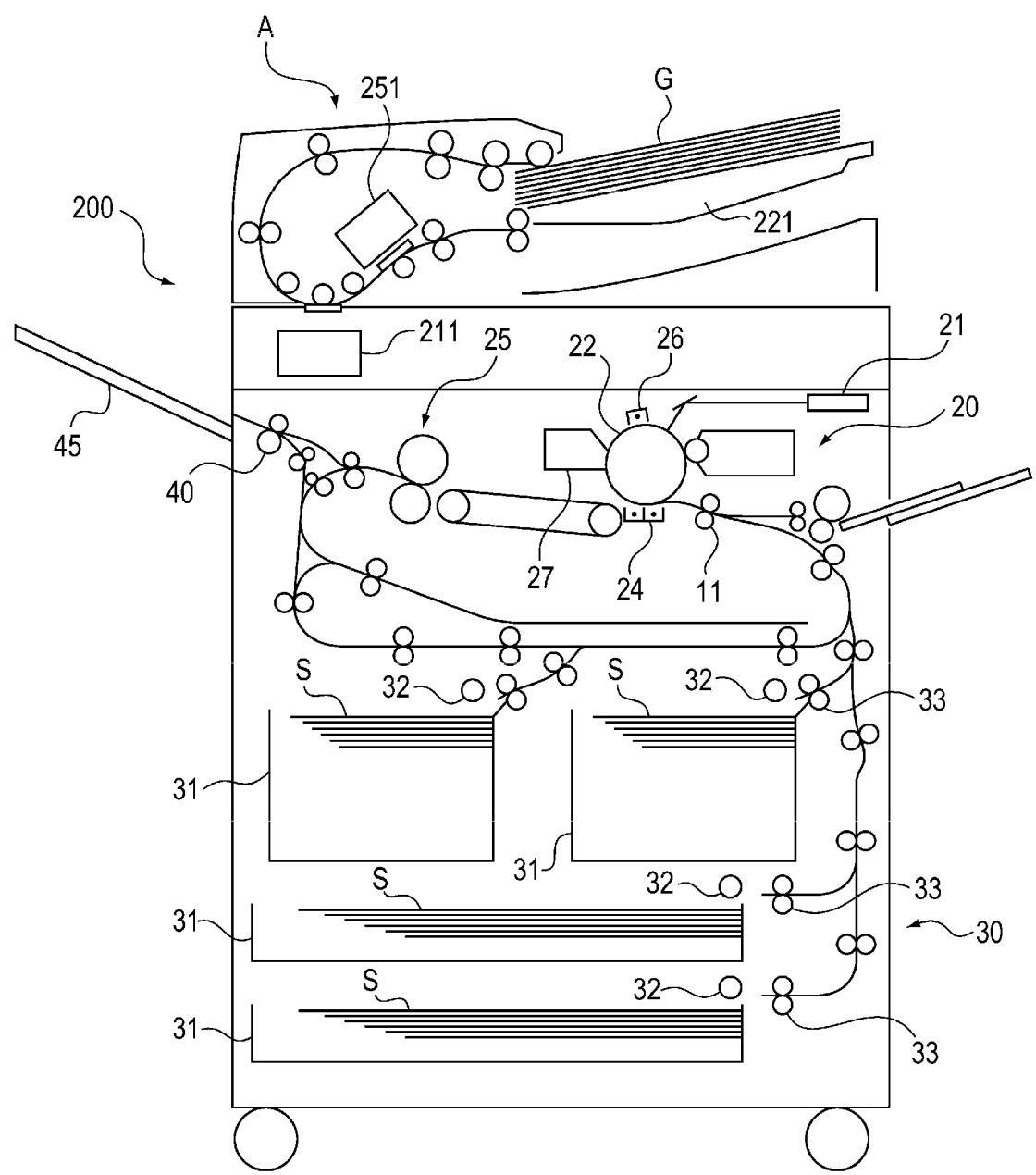
FIG. 1 is a schematic cross-sectional view of an image forming apparatus.

As illustrated in FIG. 1, the image forming apparatus A includes an image forming portion 20 configured to transfer a toner image to a sheet, a sheet feeding portion 30 configured to feed the sheet toward the image forming portion 20, a fixing portion 25 configured to fix the toner image to the sheet, and an image reading portion 200 configured to read an image on an original G.

The image forming portion 20 includes a photosensitive drum 22, a charging portion 26, a developing portion 27, a laser scanner unit 21, and a transfer portion 24.

Figure 2:
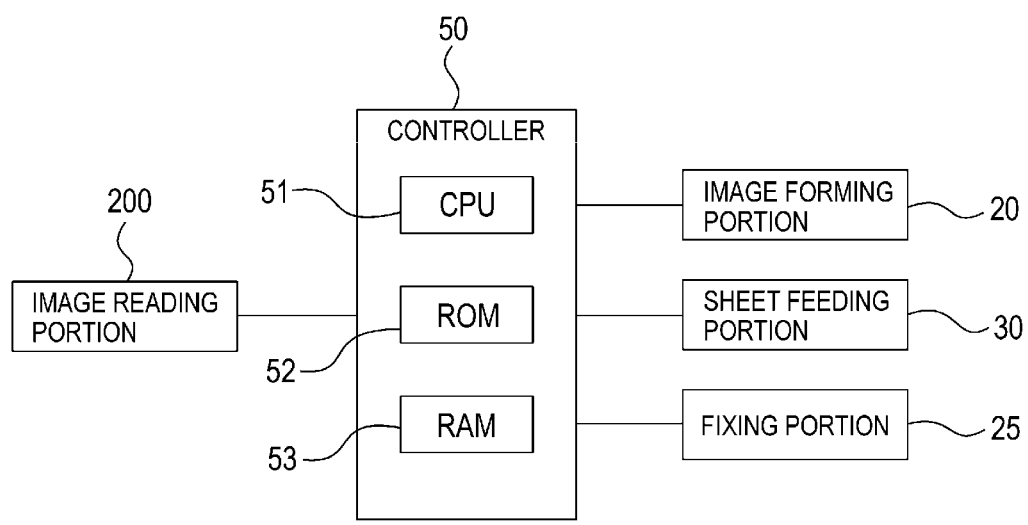
FIG. 2 is a block diagram illustrating a system configuration of the image forming apparatus.

For forming an image, when a controller 50 illustrated in FIG. 2 receives an image forming job signal, a sheet S stacked and stored in a sheet stacking portion 31 is fed by a feeding roller 32, a conveying roller 33, and the like to a registration roller 11. The registration roller 11 then feeds the sheet S to the image forming portion 20 synchronously with an operation of the image forming portion 20.

In contrast, in the image forming portion 20, a bias is applied to the charging portion 26, so that a surface of the photosensitive drum 22 in contact with the charging portion 26 is charged. Thereafter, the laser scanner unit 21 emits a laser beam from a light source, not illustrated, and irradiates the photosensitive drum 22 with the laser beam according to image information. Accordingly, a potential of the photosensitive drum 22 is partly lowered and an electrostatic latent image according to the image information is formed on the surface of the photosensitive drum 22.

Thereafter, the developing portion 27 attaches toner to the electrostatic latent image formed on the surface of the photosensitive drum 22 by, so that a toner image is formed. Next, the toner image formed on the surface of the photosensitive drum 22 is sent to a transfer nip portion formed between the photosensitive drum 22 and the transfer portion 24. When the toner image reaches the transfer nip portion, a bias having an opposite-polarity from a charging polarity of the toner is applied to the transfer portion 24, and thus the toner image is transferred to the sheet S.

Thereafter, the sheet S having the toner image transferred thereon is sent to the fixing portion 25, is heated and pressurized at a fixing nip portion formed between the heating portion and a pressurizing portion of the fixing portion 25, the toner image is fixed on the sheet S. The sheet S is then discharged onto a discharge tray 45 by a discharge roller 40.

<Controller>

Next, a configuration of a controller of the image forming apparatus A will be described.

FIG. 2 is a block diagram illustrating a part of a system configuration of the image forming apparatus A. As illustrated in FIG. 2, the image forming apparatus A includes the controller 50, and the controller includes a CPU 51, a ROM 52, and a RAM 53. The image forming portion 20, the sheet feeding portion 30, the fixing portion 25, and the image reading portion 200 are connected to the controller 50.

The ROM 52 stores a control program, various data, tables, and the like. The CPU 51 performs various operations based on the control program or information stored in the ROM 52. The RAM 53 includes a program loading region, an operating region, and a storage region for storing various data.

That is, in the controller 50, the CPU 51 controls various devices of the image forming apparatus A while using the RAM 53 as the operating region based on the control program stored in the ROM 52. The CPU 51 then causes the image reading portion 200 to perform the above described image forming operation including reading the image, forming the toner image on the photosensitive drum 22, and fixing the toner image to the sheet S. The controller 50 also controls various motors, not illustrated and described later, provided in the image reading portion 200.

<Image Reading Apparatus>

Next, a configuration of the image reading portion 200 which corresponds to the image reading apparatus will be described.

Figure 3:
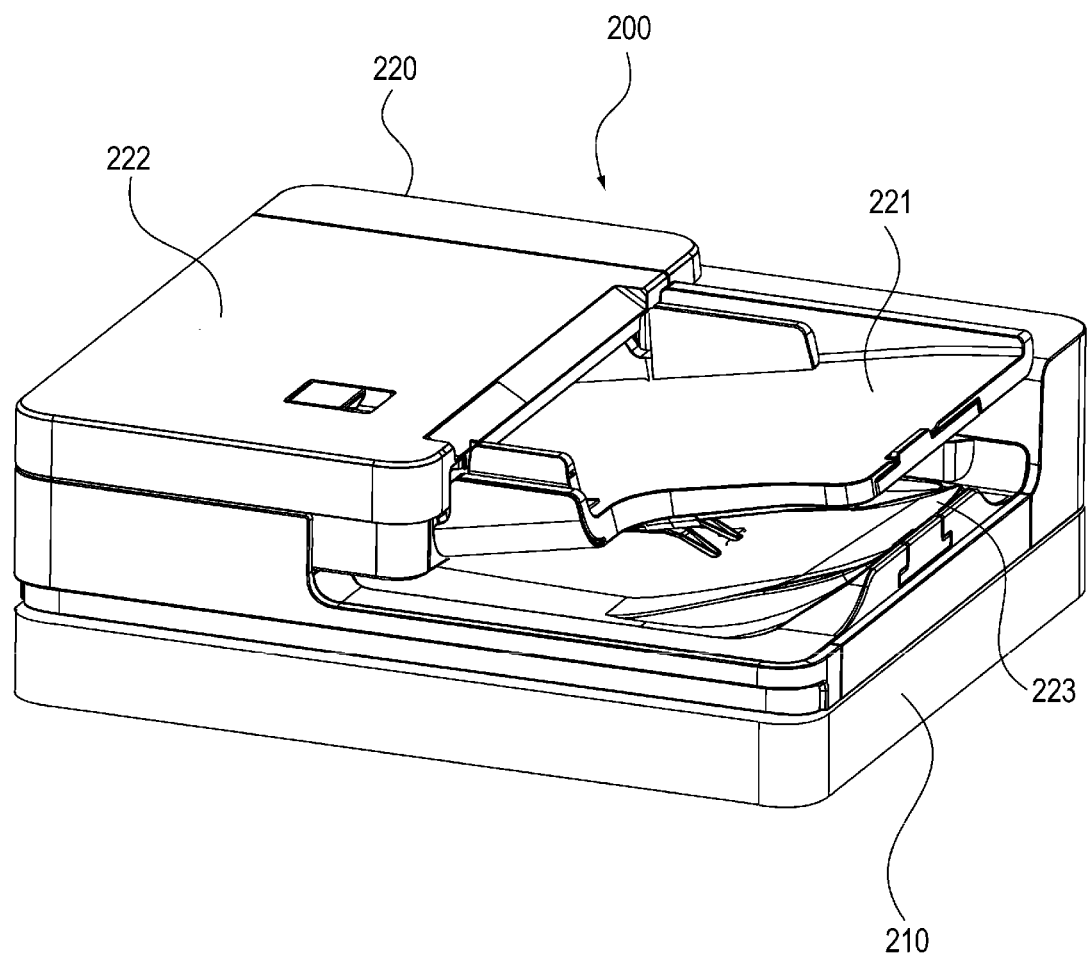
FIG. 3 is a perspective view of an image reading portion.
Figure 4:
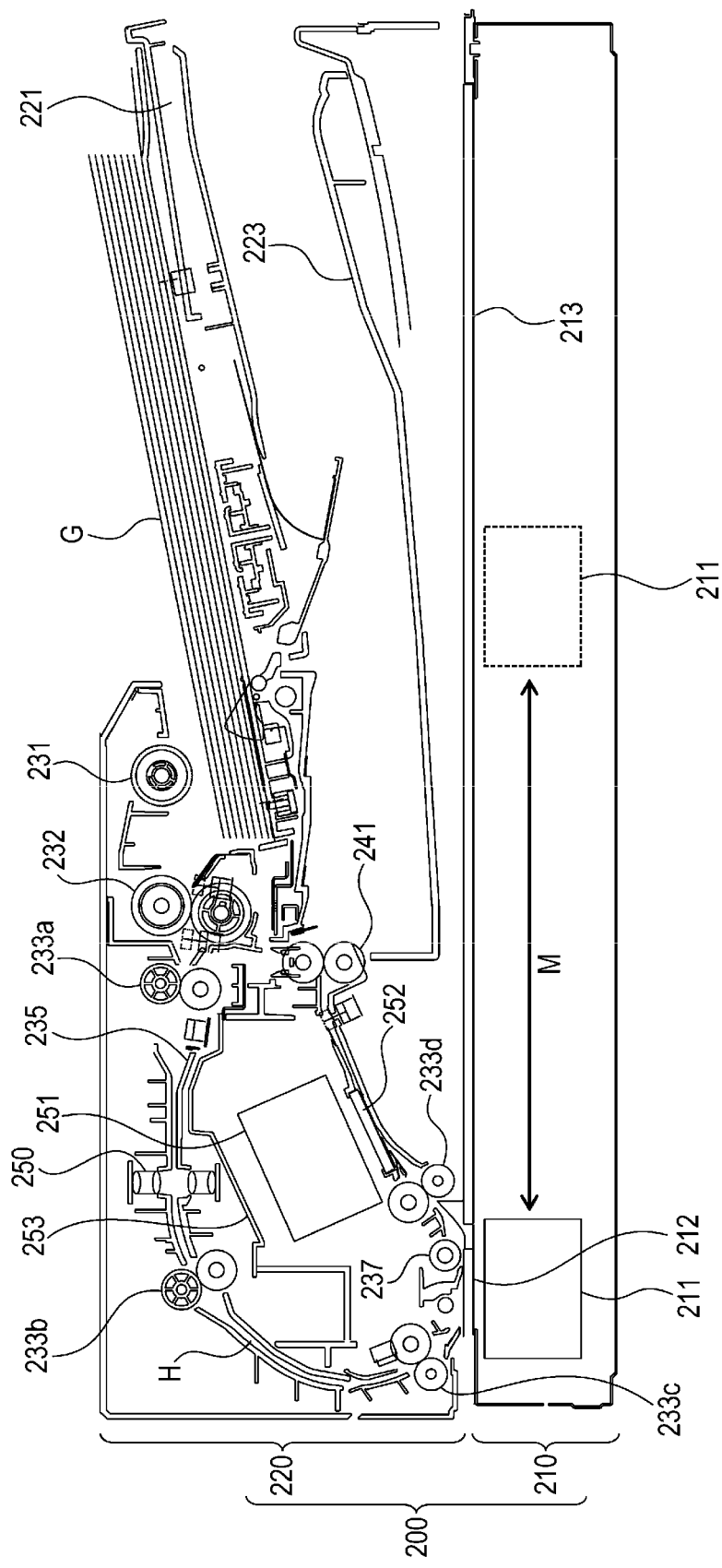
FIG. 4 is a cross-sectional view of the image reading portion.

FIG. 3 is a schematic view of the image reading portion 200. FIG. 4 is a cross-sectional view of the image reading portion 200. As illustrated in FIG. 3 and FIG. 4, the image reading portion 200 includes a scanner portion 210 and an ADF 220. The ADF 220 is supported rotatably with respect to the scanner portion 210 via a hinge, not illustrated.

The scanner portion 210 includes a first scanner unit 211 (first image reading portion) configured to read the image on the original a first glass plate 212, which is a platen glass, and an original base plate glass 213 disposed in alignment with the first glass plate 212 in a sub-scanning direction.

The first scanner unit 211 is an image sensor (CCD sensor) of a reduction optical system. The first scanner unit 211 irradiates the reading side of the original G with light through the first glass plate 212 from an LED array, images a reflected light onto the sensor element, and reads image information on the original reading side.

The first scanner unit 211 is connected to a drive belt, not illustrated. The first scanner unit 211 is moved by a drive belt driven by a driving force of a motor, not illustrated, in directions indicated by an arrow M in FIG. 4 between a position below the first glass plate 212 and a position B below the original base plate glass 213. It should be noted that the controller 50 can detect a position of the first scanner unit 211 from a position sensor (not illustrated) and the number of rotation pulses of the motor (not illustrated).

A method of reading the image on an original G by the image reading portion 200 includes a method of reading the image on the original G using the ADF 220 and a method of reading the image by placing the original G on the original base plate glass 213. The former method will be described later. The latter method includes placing the original G on the original base plate glass 213 and reading the image while moving the first scanner unit 211 in the directions indicated by the arrow M illustrated in FIG. 4. An access to the original base plate glass 213 is achieved by rotating and opening the ADF 220 upward. It should be noted that the ADF 220 is provided with a resin plate, not illustrated, for pressing the original G to prevent the original G placed on the original base plate glass 213 from moving.

The ADF 220 includes a stack tray 221 in which the original G is stacked, an original feeding roller 231 configured to feed the original G stacked on the stack tray 221, and a conveyance guide 235 configured to guide the original G to a conveyance path H which conveys the original G by guiding a lower side of the original G The presence or absence of the original G placed on the stack tray 221 can be detected by a sensor, not illustrated.

The conveyance guide 235 includes holes 80 (FIG. 5) formed therethrough. In the holes 80, conveying rollers 233 (233a to 233d) configured to rotate and convey the original G are provided. In the holes 80, a gap P is formed between the conveyance guide 235 and each of the conveying rollers 233. With the provision of the gap P, each of the conveying rollers 233 can rotate without interference with the conveyance guide 235, and the original G can come into contact with the conveying rollers 233.

The conveyance guide 235 also include a hole 81 (FIG. 5) formed therethrough. In the hole 81, an ultrasound sensor 250 (detecting portion) configured to detect overlap feeding of the originals G is provided. The ultrasound sensor 250 detect overlap feeding of the original G by detecting an intensity of ultrasound emitted from an oscillating portion and received by an oscillation receiving portion. It should be noted that a configuration provided, for example, with a photo-interrupter instead of the ultrasound sensor 250 is also applicable. The photo-interrupter is a sensor configured to detect passage of the original G for detecting jamming. That is, the hole 81 formed in the conveyance guide 235 is a hole where the detecting portion configured to detect the original G is provided.

The ADF 220 includes a second scanner unit 251 (second image reading portion) configured to read an image on the original G and a second glass plate 252 (transparent member) provided at a position apart from the second scanner unit 251. The second scanner unit 251 is a member configured to read an image on a downstream side of the first scanner unit 211 in a direction of conveyance of the original G conveying direction, and is also an image sensor of a reduction optical system (CCD sensor) in the same manner as the first scanner unit 211. The second scanner unit 251 irradiates the original reading side of the original G with light through the second glass plate 252 from an LED array, images a reflected light onto the sensor element, and reads image information on the reading side of the original G The second glass plate 252 is configured to be movable by a movable portion (not illustrated) having a motor.

The ADF 220 includes a separating roller 232 configured to separate the original G into a single sheet, a platen roller 237 disposed right above the first glass plate 212 and configured to be rotated by a driving force of a motor not illustrated, and an original discharging portion 223 configured to stack the original G discharged by the original discharge roller 241.

Next, a method of reading an image on the original using the ADF 220 will be described.

When the reading operation is started, first, the first scanner unit 211 scans a reference portion, not illustrated, provided on the original base plate glass 213 at the same height as the height of the conveyance path where the original G passes, to correct variation in color caused by individual differences of light sources. The reference portion serves as a reference of white color of the original G In the same manner, the second scanner unit 251 scans a reference portion, not illustrated, provided on the second glass plate 252 to correct variation in color caused by individual differences of light sources.

In other words, the second glass plate 252 includes a transparent portion, which is transparent, and a reference portion, which is not transparent. When the second scanner unit 251 scans the reference portion, the second glass plate 252 is moved to a predetermined position for making the reference portion scanned. In this manner, the second glass plate 252 configured to be movable eliminates necessity of a space for moving the second scanner unit 251, which contributes to miniaturization of the apparatus.

Next, the original G stacked on the stack tray 221 is fed by the original feeding roller 231, and is separated into a single sheet at a separating nip portion of the separating roller 232. Thereafter, the original G separated into a single sheet is conveyed to the conveying rollers 233a to 233c and reaches the first glass plate 212. At an image reading position on the first glass plate 212, the first scanner unit 211 reads an image on a first side of the original G Simultaneously, the platen roller 237 holds the original G from a second side to suppress uplift from the first glass plate 212.

Next, the original G is conveyed by the conveying roller 233d and reaches the second glass plate 252. If reading of the second side of the original G is instructed from the user, the image on the second side of the original G is read by the second scanner unit 251 at an image reading position on the second glass plate 252. In other words, when the second scanner unit 251 reads the image, the original G is in contact with the second glass plate 252. Thereafter, the original G is discharged to the original discharge portion 223 by the original discharge roller 241.

<Foreign Substances>

Foreign substances T such as paper dust of original G and shavings of the conveying rollers 233 generated in a conveyance path H will be described below.

Figure 5:
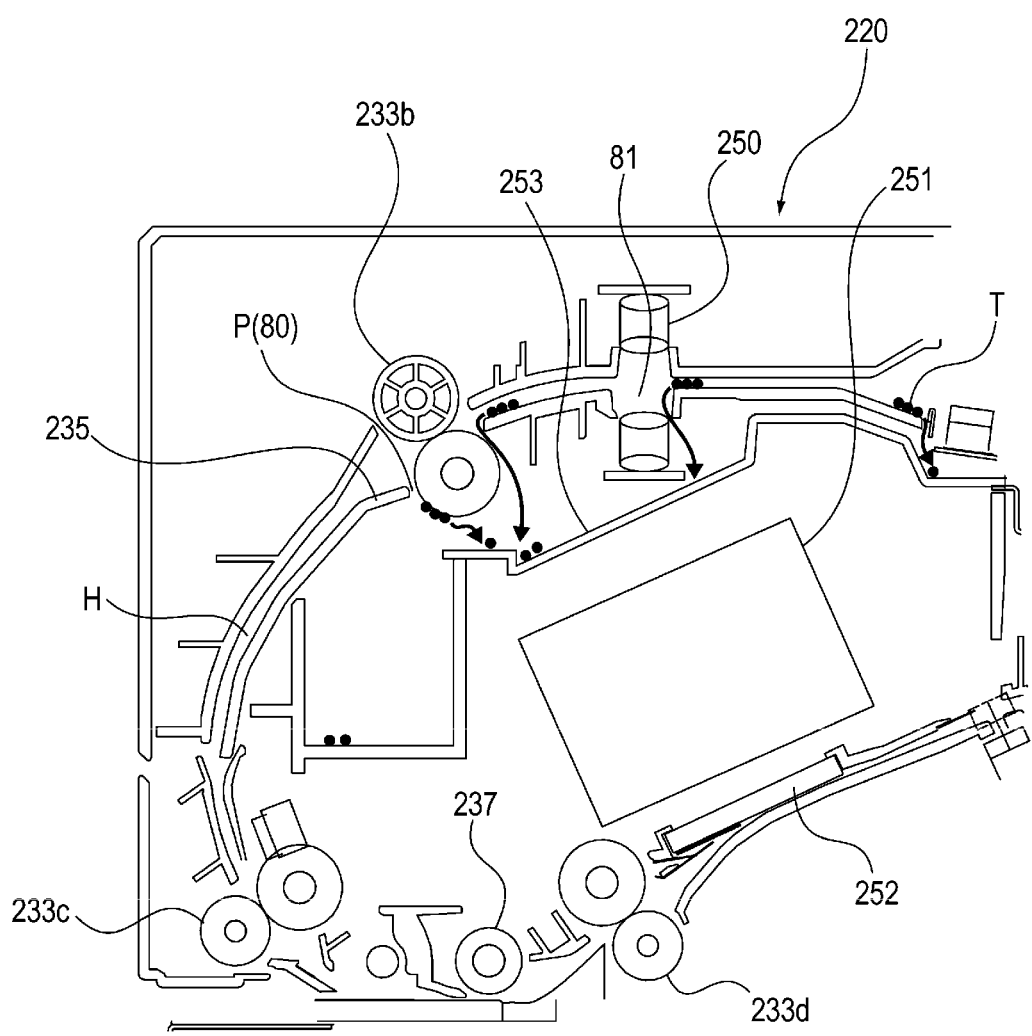
FIG. 5 is an enlarged cross-sectional view of an ADF.

FIG. 5 is an enlarged cross-sectional view of the ADF 220. As illustrated in FIG. 5, when reading the original using the ADF 220, foreign substances T such as paper dust of the original G and shavings of the conveying rollers 233 are generated in the conveyance path H. The foreign substances T move in the ADF 220 due to the gravity or by accompanying the original and may fall through the gaps P between the conveyance guide 235 and the conveying rollers 233 at the holes 80 or through the hole 81.

Figure 6:
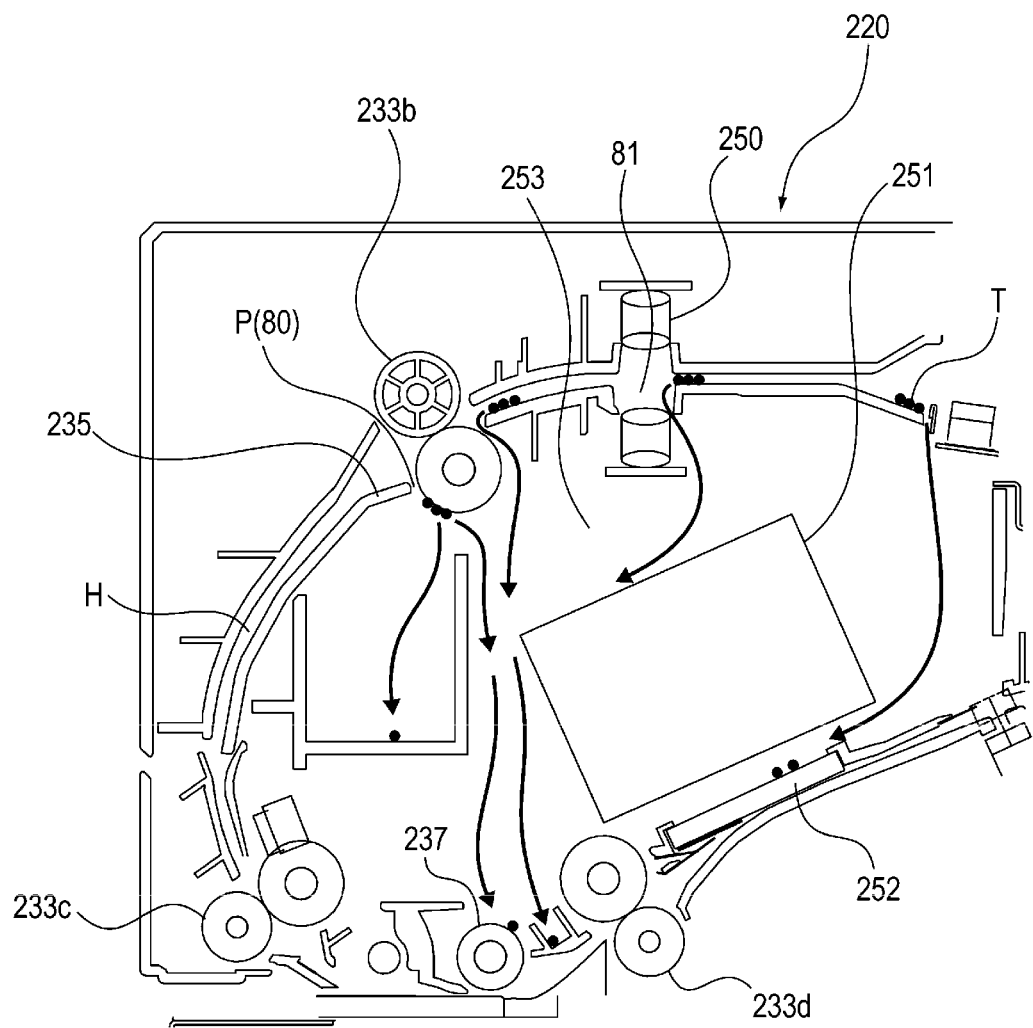
FIG. 6 is an enlarged cross-sectional view of the ADF with the absence of a dustproof member is not provided.

In a configuration of the related art illustrated in FIG. 6, the foreign substance T fallen through the gaps P or the hole 81 fall into a space where the second scanner unit 251 is disposed, and may enter a gap between the second scanner unit 251 and the second glass plate 252. If the foreign substances T enter the gap between the second scanner unit 251 and the second glass plate 252, the foreign substances T may block light irradiated from the second scanner unit 251, which may result in image noise appearing linearly and thus in deterioration of image reading quality.

Accordingly, in this embodiment, a dustproof member 253 that partitions a space between the conveyance guide 235 and the second scanner unit 251 is provided to prevent entry of the foreign substances T falling through the gaps P and the hole 81 into the gap between the second scanner unit 251 and the second glass plate 252. That is, the dustproof member 253 traps the foreign substances T falling through the gaps P and the hole 81. The dustproof member 253 is assembled to a member that retains the conveyance guide 235.

With the provision of the dustproof member 253, entry of the foreign substances T into a gap between the second scanner unit 251 and the second glass plate 252 is suppressed. Therefore, blocking of light irradiated from the second scanner unit 251 by the foreign substance T may be suppressed. Therefore, occurrence of the image noise appearing linearly on the image obtained by reading the second side of the original G is suppressed, and thus deterioration of reading quality of the image is prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142126, filed Jul. 30, 2018, which is hereby incorporated by reference herein in its entirety.

What is claimed is:

1. An image reading apparatus comprising:
   a conveying roller configured to rotate to convey an original;
   a conveyance guide configured to guide a lower side of the original and guide the original to a conveyance path, the conveyance guide including a hole in which the conveying roller is disposed;
   a first image reading portion configured to read an image on a first side of the original being conveyed in the conveyance path;
   a second image reading portion configured to read an image on a second side of the original being conveyed in the conveyance path on a downstream side of the first image reading portion in a conveying direction of the original, the second image reading portion being disposed below the conveyance guide;
   a transparent member provided on a position apart from the second image reading portion, the transparent member coming into contact with the original when the second image reading portion reads the image; and a dustproof member configured to trap a foreign substance falling through a gap between the conveyance guide and the conveying roller at the hole, wherein the dustproof member partitions a space between the conveyance guide and the second image reading portion.

2. The image reading apparatus according to claim 1, further comprising:

a detecting portion configured to detect the original, wherein the conveyance guide includes a hole in which the detecting portion is provided, the dustproof member partitions a space between the conveyance guide and the second image reading portion to prevent a foreign substance falling through the hole in which the detecting portion is provided from entering a gap between the second image reading portion and the transparent member.

3. The image reading apparatus according to claim 1, wherein the second image reading portion irradiates the original with light through the transparent member and detects the light reflected from the original to read the image.

4. The image reading apparatus according to claim 1, further comprising:

a movable portion configured to move the transparent member, wherein the transparent member includes a transparent portion and a reference portion, the transparent portion is transparent and the reference portion is used by the second image reading portion to determine a reference of color by being irradiated with light, and the movable portion moves the transparent member to a position where the second image reading portion irradiates the transparent portion with light and a position where the second image reading portion irradiates the reference portion with light.

5. The image reading apparatus according to claim 1, wherein the dustproof member is assembled to a member that retains the conveyance guide.

6. The image reading apparatus according to claim 1, wherein the second image reading portion is an image sensor of a reduction optical system.

7. An image forming apparatus comprising:

an image reading apparatus configured to read an image on an original;

an image forming portion configured to form an image of the original read by the image reading apparatus on a sheet;

the image reading apparatus comprising:

a conveying roller configured to rotate to convey the original;

a conveyance guide configured to guide a lower side of the original and guide the original to a conveyance path, the conveyance guide including a hole in which the conveying roller is disposed;

a first image reading portion configured to read an image on a first side of the original being conveyed in the conveyance path;

a second image reading portion configured to read an image on a second side of the original being conveyed in the conveyance path on a downstream side of the first image reading portion in a conveying direction of the original, the second image reading portion being disposed below the conveyance guide;

a transparent member provided on a position apart from the second image reading portion, the transparent member coming into contact with the original when the second image reading portion reads the image; and a dustproof member configured to trap a foreign substance falling through a gap between the conveyance guide and the conveying roller at the hole, wherein the dustproof member partitions a space between the conveyance guide and the second image reading portion.

* * * * *